United States Patent [19]
Brock

[11] Patent Number: 6,020,990
[45] Date of Patent: Feb. 1, 2000

[54] R.F. SIGNAL SUMMING USING NON-LINEAR OPTICAL PHASE CONJUGATION

[75] Inventor: John C. Brock, Redondo Beach, Calif.

[73] Assignee: TRW Inc., Redondo Beach, Calif.

[21] Appl. No.: 09/076,019

[22] Filed: May 11, 1998

[51] Int. Cl.⁷ ............................................. G02B 26/08
[52] U.S. Cl. ........................ 359/300; 359/245; 359/338; 342/368; 342/372; 342/374; 385/5; 385/122; 372/3
[58] Field of Search ................................. 359/245, 276, 359/278, 279, 300, 338; 342/368, 372, 374, 376, 370; 385/5, 9, 122; 372/3, 22

[56] References Cited

U.S. PATENT DOCUMENTS

| | | | |
|---|---|---|---|
| 3,611,400 | 10/1971 | Klyoshi et al. | |
| 3,999,182 | 12/1976 | Moeller et al. | 342/372 |
| 4,079,379 | 3/1978 | Piesinger | 342/368 |
| 4,079,381 | 3/1978 | Piesinger | 342/368 |
| 4,123,759 | 10/1978 | Hines et al. | 343/832 |
| 4,220,928 | 9/1980 | Bloom et al. | 359/300 |
| 4,233,606 | 11/1980 | Chernoff | 342/370 |
| 4,291,939 | 9/1981 | Giallorenzi et al. | 385/9 |
| 4,612,547 | 9/1986 | Itoh | 342/372 |
| 4,717,918 | 1/1988 | Finken | 342/368 |
| 4,767,195 | 8/1988 | Pepper | 359/276 |
| 4,778,261 | 10/1988 | Boyd et al. | 359/300 |
| 4,880,295 | 11/1989 | Rockwell et al. | 359/300 |
| 4,958,908 | 9/1990 | Rockwell et al. | 359/300 |
| 5,064,140 | 11/1991 | Pittman et al. | 244/3.13 |
| 5,170,268 | 12/1992 | Ewbank et al. | 359/300 |
| 5,206,922 | 4/1993 | Westland et al. | 385/5 |
| 5,351,250 | 9/1994 | Scott | 372/3 |
| 5,402,259 | 3/1995 | Lembo et al. | 359/245 |
| 5,493,691 | 2/1996 | Barrett | 455/20 |
| 5,596,667 | 1/1997 | Watanabe | 385/122 |
| 5,798,853 | 8/1998 | Watanabe | 359/300 |

OTHER PUBLICATIONS

"Phase Conjugation by Saturable–Gain Degenerate Four–Wave Mixing in Solid–State Laser Media" by Brignon et al., *SPIE*, vol. 2771, pp. 64–74, 1996.

"Four–Wave Mixing: Applications Both To Fundamental Research and Photonics Technology", by Prasad, *SPIE*, Critical Reviews, vol. CR 69, pp. 23–42, 1997.

"A Review of Brillouin Enhanced Four–Wave Mixing", by A.M. Scott, et al., *IEEE Journal of Quantum Electronics*, vol. 25, No. 3, Mar. 1989, pp. 438–459.

"Correction of Optical Path Differences Using Phase Conjugation In Single Mode Diode Lasers", by F.G. Patterson and J.C. Brock, *Optics Letters*, vol. 16 No. 17, pp. 13–24, 1991.

*Primary Examiner*—Loha Ben
*Attorney, Agent, or Firm*—Michael S. Yatsko

[57] ABSTRACT

A system for summing RF modulated optical signals. In order to compensate for performance degradation at the summing junction, the system utilizes four-wave mixing elements to provide the phase conjugates of each of the modulated RF signals. The phase conjugates of the RF modulated optical signals are summed at the summing junction. The use of the phase conjugates of the RF modulated optical signals compensates for optical phase errors known to degrade performance when summing RF modulated optical signals.

13 Claims, 1 Drawing Sheet

R.F. SIGNAL SUMMING USING NON-LINEAR OPTICAL PHASE CONJUGATION

BACKGROUND OF THE INVENTION

1. Field of the Invention

The present invention relates to a system for summing RF signals modulated on an optical carrier and more particularly, to a system which compensates for optical fading of the RF modulated optical signals at a summing junction in which the RF modulated optical signals are each applied to a four-wave mixing element to produce phase conjugates of the signals, which, in turn are summed at a summing junction.

2. Description of the Prior Art

In order to transmit RF signals with higher frequencies, such as microwave and millimeter wave frequencies, and wider signal bandwidths, optical communication systems are known to be used. In such systems, the RF signals are modulated onto an optical carrier. The RF modulated optical signals are then used in various optical communication systems. Examples of such optical communication systems are disclosed in U.S. Pat. Nos. 4,233,606; 4,767,195; 5,064,140 and 5,493,691.

In such optical communication systems, the RF modulated optical signals are transmitted through the atmosphere. In order to compensate for atmospheric perturbations which affect the performance of such optical communication systems, optical phase conjugation techniques are known to be used. Such optical phase conjugation techniques are known to compensate for atmospheric perturbations of the optical phase of the optical carrier.

Certain other applications of RF modulated optical signals are problematic, such as phased array antenna application. Phased array antenna systems are generally known in the art. Examples of such phased array antenna systems are disclosed in U.S. Pat. Nos. 3,611,400; 3,999,182; 4,079,379; 4,079,381; 4,123,759; 4,612,547; and 4,717,918. Such phased array antennas normally consist of a number of linearly arranged antenna elements that form an array. The antenna elements are normally coupled to a single RF modulated optical signal source. Since the antenna elements are fixed in position, the radiation elements can be altered or steered by controlling the electrical phase or time delay of the optical signal applied to each of the antenna elements. The phase or time delay control of the individual antenna elements allows the composite beam to be scanned over an area of interest without movement of an antenna.

When such phased array antenna systems use optical carriers for RF beam forming, they require the summing of RF modulated optical signals. Optical combining of RF modulated optical signals is complicated by optical fading at the summing junction, introduction of non-linearities for single mode couplers and the limited number of high frequency signals that can be combined at a single photodetector. Known solutions involve either the stringent control of the optical phase which is relatively expensive and impractical in most applications or the use of multiple optical wavelengths. The use of multiple optical wavelengths is also limited either by the frequency response of the applicable photodetector or the number of wavelengths required.

SUMMARY OF THE INVENTION

It is an object of the present invention to solve various problems in the prior art.

It is yet another object of the present invention to provide a system for enabling RF modulated optical signals to be summed at a summing junction which compensates for various problems associated therewith which obviates the need for controlling the optical phase or the use of multiple optical wavelengths. Briefly, the present invention relates to a system for summing RF modulated optical signals. In order to compensate for performance degradation at the summing junction, the system utilizes four-wave mixing elements to provide the phase conjugates of each of the modulated RF signals. The phase conjugates of the RF modulated optical signals are summed at the summing junction. The use of the phase conjugates of the RF modulated optical signals compensates for known performance degradation normally associated with the summing of RF modulated optical signals.

DESCRIPTION OF THE DRAWINGS

These and other objects of the present invention will be readily understood with reference to the following specification and attached drawings wherein.

DETAILED DESCRIPTION

The system in accordance with the present invention is adapted to compensate for known performance degradation in systems which require summing of RF modulated optical signals, which obviates the need for control of the optical phase as well as the use of multiple optical wavelengths. Rather, the system in accordance with the present invention utilizes optical phase conjugation to compensate for performance degradation. As will be discussed in more detail below, four-wave mixing elements are used to impose the RF signal onto the phase conjugate of the optical carrier. The phase conjugates of the RF modulated signals are summed at a summing junction. By summing the phase conjugates of the RF modulated optical signals, performance degradation heretofore known in such an application is eliminated.

In accordance with an important aspect of the invention, phase conjugation of the optical signals is accomplished by four-wave mixing (FWM) devices. Such FWM devices are discussed in detail in "A Review of Brillouin Enhanced Four-Wave Mixing", by A. M. Scott, et al., *IEEE Journal of Quantum Electronics,* vol. 25, no. 3, March 1989, pp. 438–459; "Correction of Optical Path Differences Using Phase Conjugation In Single Mode Diode Lasers", by F. G. Patterson and J. C. Brock, *Optics Letters,* vol. 16 no. 17, pp. 13–24, 1991, "Phase Conjugation By Saturable Gain Degenerate Four-Wave Mixing In Solid State Laser Media", by Brignan et al., *SPIE,* vol 2771, pp. 64–74, 1996. "Four Wave Mixing: Applications Both To Fundamental Research and To Photonics Technology", by Prasad, *SPIE,* Critical reviews vol. CR 609, pp. 23–42, 1997, all hereby incorporated by reference. In general, optical phase conjugation is a process in which the propagation direction and relative phase of the optical signal is reversed so that it exactly retraces its path. Although other optical phase conjugation techniques are known, four-wave mixing is particularly suitable since it offers a convenient method for applying RF signals onto a conjugate of the optical carrier to produce RF modulated optical signals. As used herein, RF modulated optical signals refer to those signals resulting from applying RF signals to a phase conjugate of the carrier signal.

Figure 1:
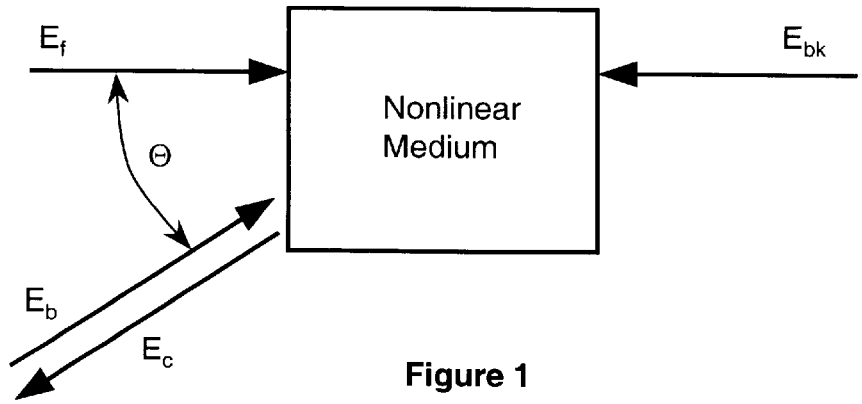
FIG. 1 is a block diagram of a four-wave mixing element.

FIG. 1 illustrates a block diagram of a four-wave mixing device. As shown, three input wave $E_f$, $E_{bk}$, and $E_b$ are directed to a material with a non-linear response. The three input waves are mixed to form a fourth wave $E_c$, which is radiated from the medium with a frequency and direction determined by the frequencies and the propagation directions of the three input waves. As shown in FIG. 1, the waves $E_f$ and $E_{bk}$ are two counter-propagating plane wave pumps while the wave $E_b$ is an input wave. As long as the plane wave pumps $E_f$ and $E_{bk}$ are phase conjugates of one another, the resulting output wave $E_c$ will be the phase conjugate of the input wave $E_b$.

Figure 2:
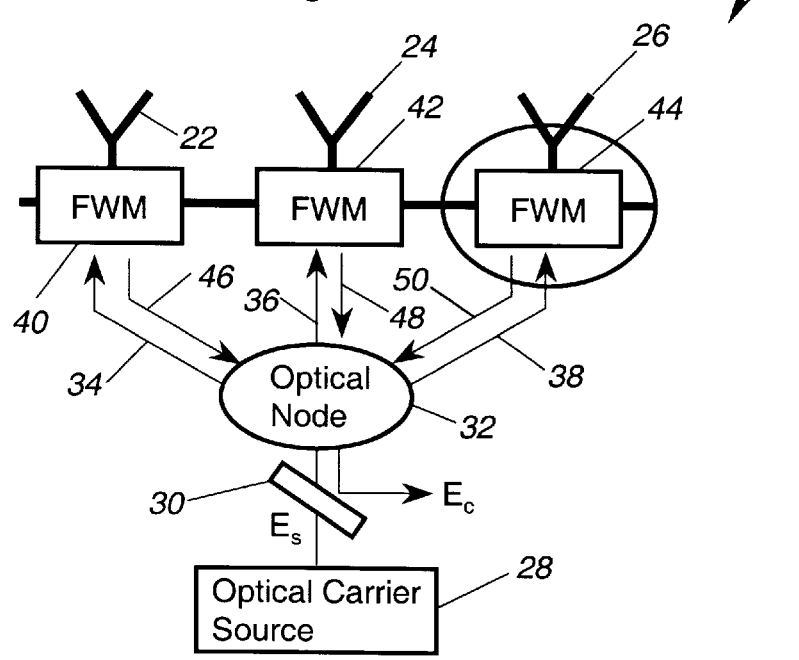
FIG. 2 is a block diagram of a system for summing RF modulated optical signals in accordance with the present invention.

As discussed above, optical errors occur at optical splitting and summing junctions. These errors are known to be due to variations in the optical path lengths due to temperature and mechanical stress on the fiber components. Such errors have not heretofore been known to be correctable except by elaborate and expensive mechanisms for changing the optical phase at each summing point. In the present invention, the implementation of optical phase conjugation by way of four-wave mixing devices exactly corrects for any optical phase errors introduced onto the input wave $E_b$ as it propagates forward in the distribution network (FIG. 2). As a result, the conjugated signal, $E_c$, adds with precisely the right phase for coherent addition at each summing/splitting junction.

Referring to FIG. 2, the system for summing RF modulated optical signals is illustrated and generally identified with the reference numeral 20. As shown, the system 20 is used in a phased array antenna application which includes a plurality of phased array antenna elements 22, 24 and 26. It should be understood by those of ordinary skill in the art, that the system 20 in accordance with the present invention is adapted to be used with other systems and virtually any system which requires the summing of RF modulated optical signals.

As shown, an optical carrier 28 is distributed to a number of RF signal input ports which may be sub arrays or individual elements of a phased array antenna system. More particularly, the optical carrier is applied to a partially reflecting mirror 30 which allows transmission of the optical carrier therethrough to an optical node 32 and reflects the summed signal $E_c$ from the optical node 32. The optical node 32 may be, for example a beam splitter which divides the optical carrier 28 into 3 beams 34, 36 and 38. The split beams 34, 36 and 38 from the optical node 32 are directed to the four-wave mixing devices 40, 42 and 44, respectively. As mentioned above, as long as the four-wave mixing elements are pumped by light waves which are the phase conjugate of each other, the four-wave mixing devices 40, 42 and 44 will produce an output beam which is the phase conjugate of the input beam. Thus, the beams 46, 48 and 50 are generated by the four-wave mixing systems 40, 42 and 44, respectively. The beams 46, 48 and 50 are the phase conjugates of the input beams 34, 36 and 38 respectively. The phase conjugate beams 46, 48 and 50 are summed in the optical node 32 to produce the optical signal $E_c$, which in turn, is reflected from the mirror 30. As mentioned above, by summing the phase conjugates of the RF modulated optical signals, the phase of the optical signals are exactly controlled in the optical node to improve the performance of the optical signal summing at the optical node 32 because phase errors in paths 34, 36 and 38 as well as in the optical mode 32 are exactly compensated when the conjugate signal $E_c$ is transmitted back along the same optical paths (46, 48, 50 and 32).

Figure 3:
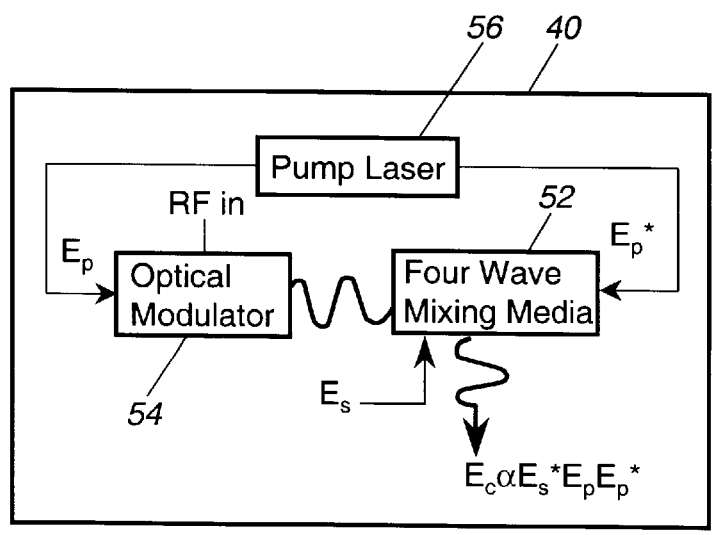
FIG. 3 is a block diagram of one of the four-wave mixing elements in accordance with the present invention.

FIG. 3 illustrates a block diagram for one of the four-wave mixing system 40. It is to be understood that the block diagram of FIG. 3 also applies to the four-wave mixing systems 42 and 44. As shown in FIG. 3, the four-wave mixing device 40 includes a four-wave mixing media 52, an optical modulator 54 and a pump laser 56. The four-wave mixing media 52 may be a non-linear optical device, such as disclosed in "A Review of Brillouin Enhances Four-Wave Mixing", supra, hereby incorporated by reference. As mentioned above, four-wave mixing devices are convenient because of the ease in which the RF signals can be modulated onto the optical carrier. The RF signal can be modulated onto one of the pumped light sources $E_f$ and $E_{bk}$ by way of the optical modulator 54 as generally shown in FIG. 2. A suitable optical modulator is disclosed in U.S. Pat. Nos. 5,402,259 and 4,291,939, hereby incorporated by reference. Laser diodes may be utilized for the pump laser 56 to produce phase conjugate light signals $E_f$ and $E_{bk}^*$. Although the optical modulator 54 and the four-wave mixing media 52 are shown as separate devices, in the case of a single mode wave guide semiconductor optical modulator, the optical modulator 54 and the four-wave mixing media 52 may be incorporated into a single device.

Although the present invention has been described in terms of a four-wave mixing system to provide phase conjugation other devices, such as real time holographic materials, can also be used. All such devices are considered to be within the broad scope of the invention.

Obviously, many modifications and variations of the present invention are possible in light of the above teachings, Thus, it is to be understood that, within the scope of the appended claims, the invention may be practiced otherwise than as specifically described above.

What is claimed and desired to be covered by a letters patent is as follows:

1. A system for summing RF signals modulated onto an optical carrier, the system comprising:

an optical carrier source;

a plurality of RF signal sources;

a plurality of modulators for applying said plurality of RF signal sources onto a conjugate of said optical carrier source defining a plurality of modulated RF optical signals; and a summing junction for summing said plurality of RF optical signals.

2. The system as recited in claim 1, wherein at least one of said plurality of modulators includes a four-wave mixing (FWM) device and means for generating pump signals.

3. The system as recited in claim 2, wherein said generating means includes a plurality of pump lasers.

4. The system as recited in claim 3, wherein said pump lasers are laser diodes.

5. The system as recited in claim 2, wherein said four-wave mixing device includes an optical modulator and a four-wave mixing media and said optical modulator and four-wave mixing media are formed as a single device.

6. A method for summing optical signals, the method comprising the steps of:

(a) generating the phase conjugates of each of said optical signals defining phase conjugate signals; and (b) summing said phase conjugate signals.

7. The method as recited in claim 6, wherein step (a) includes the steps of:

(c) providing an optical carrier;

(d) receiving RF signals; and (e) applying said RF signals onto a conjugate of said optical carrier defining RF modulated optical signals.

8. The method as recited in claim 6, wherein said phase conjugates are generated by four-wave mixing devices.

9. A system for summing optical signals, the system comprising:
   (a) means for generating the phase conjugates of said optical signals to be summed, defining phase conjugate signals; and
   (b) means for summing said phase conjugate signals.

10. The system as recited in claim 9, wherein said generating means includes an optical carrier; means for receiving RF signals; and means for applying said RF signals onto a conjugate of said optical carrier defining RF modulated optical signal.

11. The system as recited in claim 10, wherein said generating means includes a four-wave mixing device.

12. A system for summing RF signals from a phase array antenna system having a plurality of antenna elements, the system comprising:

a plurality of RF signal port for receiving RF signals from said plurality of antenna elements;

an optical carrier source for generating an optical carrier signal;

a partially reflecting mirror for transmitting said optical carrier signal and reflecting an output signal;

an optical node for splitting said optical carrier signal into a plurality of optical carrier signals and summing signals from said plurality of antenna elements;

means for applying said RF signals onto a conjugate of said optical carrier signals defining RF modulated optical signals;

means for directing said RF modulated optical signals to said optical node, where said RF optical signals are summed defining said output signal; and means for directing said output signal to said mirror.

13. The system as recited in claim 12, wherein said applying means includes a four-wave mixing device.

* * * * *